United States Patent [19]

D'Alelio

[11] 4,075,171

[45] Feb. 21, 1978

[54] PROCESS FOR PREPARING AROMATIC POLYIMIDES AND SOME POLYIMIDES PREPARED THEREBY

[75] Inventor: Gaetano F. D'Alelio, South Bend, Ind.

[73] Assignee: University of Notre Dame du Lac, Notre Dame, Ind.

[21] Appl. No.: 533,468

[22] Filed: Dec. 16, 1974

Related U.S. Application Data

[63] Continuation-in-part of Ser. No. 363,800, May 25, 1973, Pat. No. 3,998,768.

[51] Int. Cl.$^2$ .................. C08G 73/10; C08G 73/12
[52] U.S. Cl. .................. 260/47 CP; 260/33.4 P; 260/46.5 E; 260/47 UA; 260/49; 260/63 R; 260/65; 260/78 TF; 260/78 UA; 260/250 BN; 260/326 C; 260/326 S; 260/326 N; 260/326 A; 260/326 R; 260/326 HL; 428/474
[58] Field of Search .......... 260/47 CP, 65, 49, 78 TF, 260/78 UA, 47 UA, 46.5 E, 326 C, 326 S, 326 N, 326 A, 326 HI, 250 BN, 326 R

[56] References Cited

U.S. PATENT DOCUMENTS

| | | | |
|---|---|---|---|
| B 497,490 | 3/1976 | D'Alelio | 260/78 UA |
| 3,671,490 | 6/1972 | Bargain | 260/47 CP |
| 3,763,114 | 10/1973 | Saluti et al. | 260/78.4 R |
| 3,879,349 | 4/1975 | Bilow et al. | 260/47 UA |

*Primary Examiner*—Lester L. Lee
*Attorney, Agent, or Firm*—Michael, Best & Friedrich

[57] ABSTRACT

A process for preparing substantially completely cyclized aromatic polyimides, either monomeric, oligomeric or polymeric, is provided. The process involved the reaction of a mixture of at least one tetracarboxylic acid dianhydride, at least one aromatic diamine and an $\alpha,\beta$-carboxylic acid monoanhydride in at least one aromatic phenol, preferably cresols, in the presence of an organic azeotroping agent such as a cyclic hydrocarbon, preferably benzene, until substantially all of the water of reaction is eliminated. The monoanhydride provides reactive end groups which will enable the polyimide to cure by coupling together by addition or condensation thereby increasing molecular weight with little or no by-product. After the water is removed, it is preferred that the azeotroping agent be removed and then the polyimide increased in molecular weight by heating in the aromatic phenol.

The polymer can then be isolated by concentration or precipitation as a powder, or the polymer in solution can be used to prepare coatings on various substrates.

17 Claims, No Drawings

PROCESS FOR PREPARING AROMATIC POLYIMIDES AND SOME POLYIMIDES PREPARED THEREBY

RELATIONSHIP TO OTHER APPLICATIONS

This application is a continuation-in-part of my co-pending application Ser. No. 363,800, filed May 25, 1973 now U.S. Pat. No. 3,998,768.

BACKGROUND OF THE INVENTION

1. Field of Invention:

This invention relates to processes for preparing polyimides and to certain novel polyimides and more particularly to processes for preparing polyimides which are soluble in phenolic solvents.

2. Prior Art:

The prior art is replete with references teaching the preparation of polyimides and polyimide precursors by the reaction of aromatic tetracarboxylic acids, or anhydrides thereof, with aromatic diamines. While the polyimide articles formed have excellent heat resistance, it is difficult to form articles because of their insolubility and intractability. This has necessitated the use of polyimide precursors which can be shaped into the desired form and then cured to the polyimides. However, a difficulty with the precursors is their release of by-products during curing which can result in powdering and formation of voids in the article or the use of polyimides having lower thermal stability. To minimize or avoid these problems, thin layers must be used, especially in wire enameling, and the desired thickness built up by applying numerous layers. Thus, there is a continuing need in the art for thermally stable polyimides that can cure in thick sections without the aforementioned difficulties.

References illustrative of the state of the art are U.S. Pat. No. 3,277,043, issued Oct. 4, 1966 to Fred F. Holub, U.S. Pat. No. 3,678,015, issued to Fred F. Holub et al. and U.S. Pat. No. 3,666,709, issued May 30, 1972 to Munchiko Suzuki et al. The former teaches a process for preparing phenolic solvent soluble polymers by the reaction of an anhydride and diamine in a phenol under initially substantially anhydrous conditions. The latter teaches a phenolic solvent soluble polyimide by reacting an aromatic tetracarboxylic acid and a diamine in a phenolic solvent at a temperature above the boiling point of water. The second patent shows a process for preparing a polyimide precursor by reacting a diamine and an aliphatically unsaturated hydrocarbon monoanhydride (with up to 10% dianhydride) in the presence of an inert hydrocarbon solvent and an inert phenolic solvent.

SUMMARY OF THE INVENTION

According to the present invention there is provided a process for the preparation of a substantially cyclized polyimide of the formula:

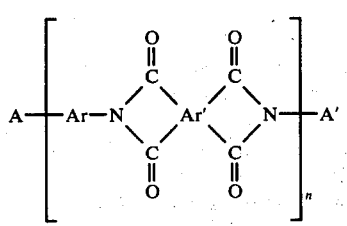 (A)

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical,
A is

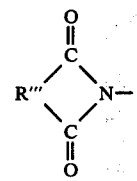

or
HOOC—R'''—CONH—
where
R''' is defined hereinafter,
A' is

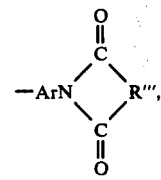

or —ArNHOCR'''COOH
where
R''' is defined hereinafter, and
n is 0 or a positive integer of at least one,
soluble in an aromatic phenol which comprises:

1. reacting a reaction mixture of at least one tetracarboxylic acid dianhydride of the formula:

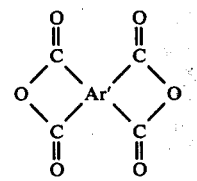 (B)

wherein Ar' is as defined above, and at least one aromatic diamine of the formula:

 (C)

wherein Ar is as defined above, at a molar ratio of dianhydride to diamine of m to m + 1 where m is zero or a positive integer of at least one and as high as n in formula (A), with the proviso that the reaction mixture contains 2 moles of an α,β-carboxylic acid monoanhydride of the formula

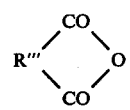

where R''' is a hydrocarbon radical of 2 to 12 carbon atoms which is saturated or unsaturated in an aromatic phenol of the formula

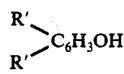

where each R' is hydrogen or —CH₃ in the presence of at least one organic azeotroping agent which:
  a. gives a water azeotrope having a boiling point less than 95° C. at atmospheric pressure,
  b. is non-reactive with the dianhydride and the diamine, and
  c. separates from water as a distinct phase,
said reaction conducted at a temperature less than 140° C. and below the boiling point of said aromatic phenol and higher than the boiling point of said azeotroping agent with the vapor phase temperature being between that of the water azeotrope and no higher than 95° C.
2. removing water of reaction and the azeotroping agent from the reaction mixture as a water azeotrope and
3. returning quantities of azeotroping agent to the reaction mixture to maintain the temperature and reaction mixture volume substantially constant.

Some novel polyimides prepared by this process are also provided.

DETAILED DESCRIPTION OF THE INVENTION

The process of the present invention uses as starting materials an aromatic dianhydride, an aromatic diamine, an aromatic phenol solvent, an organic azeotroping agent and an α,β-carboxylic acid monoanhydride. The aromatic dianhydride has the general formula:

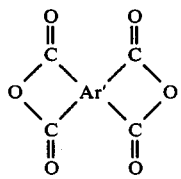

wherein Ar' is a tetravalent aromatic organic radical, preferably containing at least one ring of six carbon atoms, said ring characterized by benzenoid saturation, the four carbonyl groups being attached directly to separate carbon atoms and each pair of carbonyl groups being attached to adjacent carbon atoms in the Ar' radical. Any of the aromatic tetracarboxylic acid dianhydrides known in the prior art can be used. Among the useful dianhydrides are 3,3',4,4'-benzophenonetetracarboxylic acid dianhydride, pyromellitic dianhydride, 2,3,6,7-naphthalene tetracarboxylic acid dianhydride, 3,3',4,4'-diphenyl tetracarboxylic acid dianhydride, 1,2,5,6-napthalene tetracarboxylic acid dianhydride, 2,2',3,3'-diphenyl tetracarboxylic acid dianhydride, 2,2-bis(3,4-dicarboxyphenyl)propane dianhydride, 3,4,9,10-perylene tetracarboxylic acid dianhydride, bis(3,4-dicarboxyphenyl)ether dianhydride, napthalene-1,2,4,5-tetracarboxylic acid dianhydride, napthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride, 2,2-bis(2,3-dicarboxyphenyl)propane dianhydride, 1,1-bis-(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride and thiophene-2,3,4,5-tetracarboxylic acid dianhydride and the like. Preferred dianhydrides are 3,3',4,4'-benzophenonetetracarboxylic dianhydride, pyromellitic anhydride and 1,4,5,8-naphthalenetetracarboxylic and dianhydride with the first one most preferred.

Aromatic diamines useful in the present process have the general formula:
  NH₂ — Ar — NH₂ wherein Ar is a divalent aromatic organic radical. Preferred aromatic diamines are those wherein Ar is a divalent benzenoid radical selected from the group consisting of

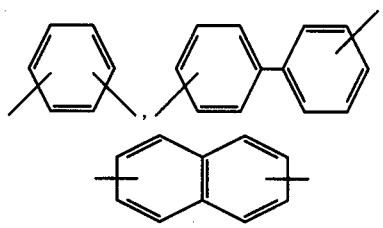

and multiples thereof connected to each other by $R^{IV}$, e.g.,

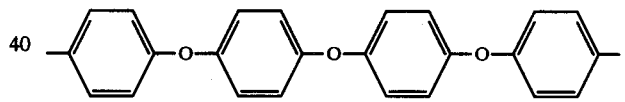

wherein $R^{IV}$ represents —CH=CH—, an alkylene chain of 1–3 carbom atoms,

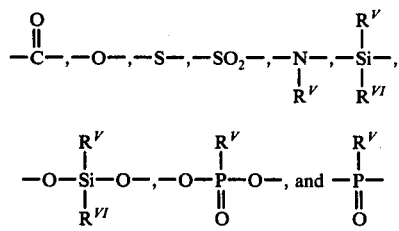

wherein $R^V$ and $R^{VI}$ are each selected from the group consisting of alkyl and aryl containing one to six carbon atoms, e.g., methyl, ethyl, propyl, hexyl, n-butyl, and i-butyl.

Examples of aromatic diamines which are suitable for use in the present invention are 4,4'-diaminodiphenyl propane, 4,4'-diamino-diphenyl methane, benzidine, 3,3'-dichlorobenzidine, 4,4'-diamino-diphenyl sulfide, 4,4'-diaminostilbene, 3,3'-diamino-diphenyl sulfone, 4,4'-diamino-diphenyl sulfone, 4,4'-diamino-diphenyl ether, 1,5-diamino naphthalene, 4,4'-diamino-diphenyl diethylsilane, 4,4'-diamino-diphenyl diphenylsilane, 4,4'-diamino-diphenyl ethyl phosphine oxide, 4,4'-diaminodiphenyl phenyl phosphine oxide, 4,4'-diamino-diphenyl N-methyl amine, 4,4'-diamino-diphenyl N-phenyl amine and mixtures thereof. 3,3'-dimethyl-4,4'-diaminodiphenylmethane, 3,3'-diethyl-4,4'-diaminodiphenylmethane, 3,3'-dimethoxy-4,4'-diaminodiphenylmethane, 3,3'-diethoxy-4,4'-diaminodiphenylmethane, 3,3'-dichloro-4,4',4,4'-diaminodiphenylmethane, 3,3'-dibromo-4,4'-diaminodiphenylmethane, 3,3'-dicarboxy-4,4'-diaminophenylmethane, 3,3'-dihydroxy-4,4'-diaminophenylmethane, 3,3'-disulpho-4,4'-diaminodiphenylmethane, 3,3'-dimethyl-4,4'-diaminodiphenylether, 3,3'-diethyl-4,4'-diaminodiphenylether, 3,3'-dimethoxy-4,4'-diaminodiphenylether, 3,3'-diethoxy-4,4'-diaminodiphenylether, 3,3'-dichloro-4,4'-diaminodiphenylether, 3,3'-dibromo-4,4'-diamino diphenylether, 3,3'-dicarboxy-4,4'-diaminodiphenylether, 3,3'-dihydroxy-4,4'-diaminodiphenylether, 3,3'-disulfo-4,4'-diaminodiphenylether, 3,3'-dimethyl-4,4'-diaminodiphenylsulfide, 3,3'-diethyl-4,4'-diaminodiphenylsulfide, 3,3'-dimethoxy-4,4'-diaminodiphenylsulfide, 3,3'-diethoxy-4,4'-diaminodiphenylsulfide, 3,3'-dichloro-4,4'-diaminodiphenylsulfide, 3,3'-dibromo-4,4'-diaminodiphenylsulfide, 3,3'-dicarboxyl-4,4'-diaminodiphenylsulfide, 3,3'-dihydroxy-4,4'-diaminodiphenylsulfide, 3,3'-disulfo-4,4'-diaminodiphenylsulfide, 3,3'-dimethyl-4,4'-diaminodiphenylsulfone, 3,3'-diethoxy-4,4'-diaminodiphenylsulfone, 3,3'-dichloro-4,4'-diaminodiphenylsulfone, 3,3'-dicarboxy-4,4'-diaminodiphenylsulfone, 3,3'-dihydroxy-4,4'-diaminodiphenylsulfone, 3,3'-disulfo-4,4'-diaminodiphenylsulfone, 3,3'-diethyl-4,4'-diaminodiphenylpropane, 3,3'-dimethoxy-4,4'-diaminodiphenylpropane, 3,3'-dibromo-4,4'-diaminodiphenylpropane, 3,3'-dichloro-4,4'-diaminodiphenylpropane, 3,3'-dicarboxy-4,4'-diaminodiphenylpropane, 3,3'-dihydroxy-4,4'-diaminodiphenylpropane, 3,3'-disulfo-4,4'-diaminodiphenylpropane, 3,3'-dimethyl-4,4'-diaminobenzophenone, 3,3'-dimethoxy-4,4'-diaminobenzophenone, 3,3'-dichloro-4,4'-diaminobenzophenone, 3,3'-dibromo-4,4'-diaminobenzophenone, 3,3'-dicarboxy-4,4'-diaminobenzophenone, 3,3'-dihydroxy-4,4'-diaminobenzophenone, 3,3'-disulphodiaminobenzophenone, 3,3'-diaminodiphenylmethane, 3,3'-diaminodiphenylether, 3,3'-diaminodiphenylsulfide, 3,3'-diaminodiphenylsulfone, 3,3'-diaminodiphenylpropane, 3,3'-diaminobenzophenone, 2,4-diaminotoluene, 2,6-diaminotoluene, 1-isopropyl-2,4-phenylenediamine, 2,4-diaminoanisole, 2,4-diaminomonochlorobenzene, 2,4-diaminofluorobenzene, 2,4-diaminobenzoic acid, 2,4-diaminophenol, and 2,4-diaminobenzenesulfonic acid, and phenylene diamines. Preferred diamines are m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene.

The aromatic phenols useful as solvents have the formula

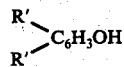

where each R' is hydrogen or a methyl radical. These phenols include phenol, the various cresol isomers such as o-, m-, and p-cresol, and the various xylenols such as 2,3-xylenol, 2,4-xylenol, 2,5-xylenol, 2,6-xylenol, 3,4-xylenol and 3,5-xylenol. Of these, the cresols are preferred. In particular, pure m-cresol or a mixture of m-cresol and the other isomers is especially preferred because of commercial availability and its ease of recovery. The ratio of phenol solvent to dianhydride and diamine can be varied over a wide range depending on the nature of the reactants. Usually, enough solvent is used to dissolve the reactants.

Any organic compound can be used as the azeotroping agent to remove water formed during the reaction provided it (a) gives a water azeotrope having a boiling point less than 95° C. at atmospheric pressure, preferably less than 90° C., (b) is non-reactive with the dianhydride and the diamine and (c) separates from water as a distinct phase when condensed so that the agent can be returned to the reaction mixture to maintain the temperature of reaction and the reaction mixture volume substantially constant (only water is depleted). The organic compound should also be soluble in the phenolic solvent. Examples of such azeotroping agents and their azeotrope boiling points with water are as follows:

| Agent | Azeotrope B.P.° C. |
|---|---|
| Benzene | 69.4 |
| Butyl chloride | 68.0 |
| Butyl ether | 94.1 |
| Butyronitrile | 88.7 |
| Carbon tetrachloride | 66.8 |
| Chloroform | 56.3 |
| Cyclohexane | 69.8 |
| 1-Butenylmethyl ether-cis | 64.0 |
| 1-Butenylmethyl ether-trans | 67.0 |
| Butyl acetate | 90.7 |
| Ethyl acetate | 70.4 |
| Ethyl benzene | 92.0 |
| Ethylbutyl ether | 76.6 |
| Ethylenedichloride | 71.6 |
| Heptane | 79.2 |
| Hexane | 61.6 |
| Isopropyl ether | 62.2 |
| Methyl acetate | 56.1 |
| Octane | 89.6 |
| Propionitrile | 82.2 |
| Propyl acetate | 82.4 |
| Tetrachloroethylene | 88.5 |
| Toluene | 85.0 |
| 1,1,2-Trichloroethane | 86.0 |
| m-Xylene | 94.5 |

Ternary systems can also be used. Illustrative ternary systems and their azeotrope boiling points with water are:

| Agents | Azeotrope B.P.° C. |
|---|---|
| Acetonitrile/Benzene | 66.0 |
| Acetonitrile/Isopropyl ether | 59.0 |
| Acetonitrile/Trichloroethylene | 67.0 |

Preferred azeotroping agents are the cyclic hydrocarbons of 6 to 8 carbon atoms, with the aromatic hydrocarbons particularly preferred. While benzene is preferred because of its low boiling point, toluene is also preferred because of its lower toxicity. Saturated cyclic hydrocarbons such as cyclohexane, cyclooctane and the like can also be used but they are not as preferred as the aromatic hydrocarbons.

Two moles of an α,β-carboxylic acid monoanhydride are used to end-cap the polyimide. Thus, when the molar ratio of dianhydride to diamine is m:m + 1, two moles of the α,β-carboxylic acid monoanhydride are added to the reaction mixture.

The α,β-carboxylic acid monoanhydride used has the formula

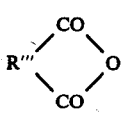

wherein R''' is a hydrocarbon radical of 2 to 12 carbon atoms which is saturated, unsaturated, i.e., has olefinic, acetylenic or benzenoid unsaturation. Examples of such monoanhydrides are

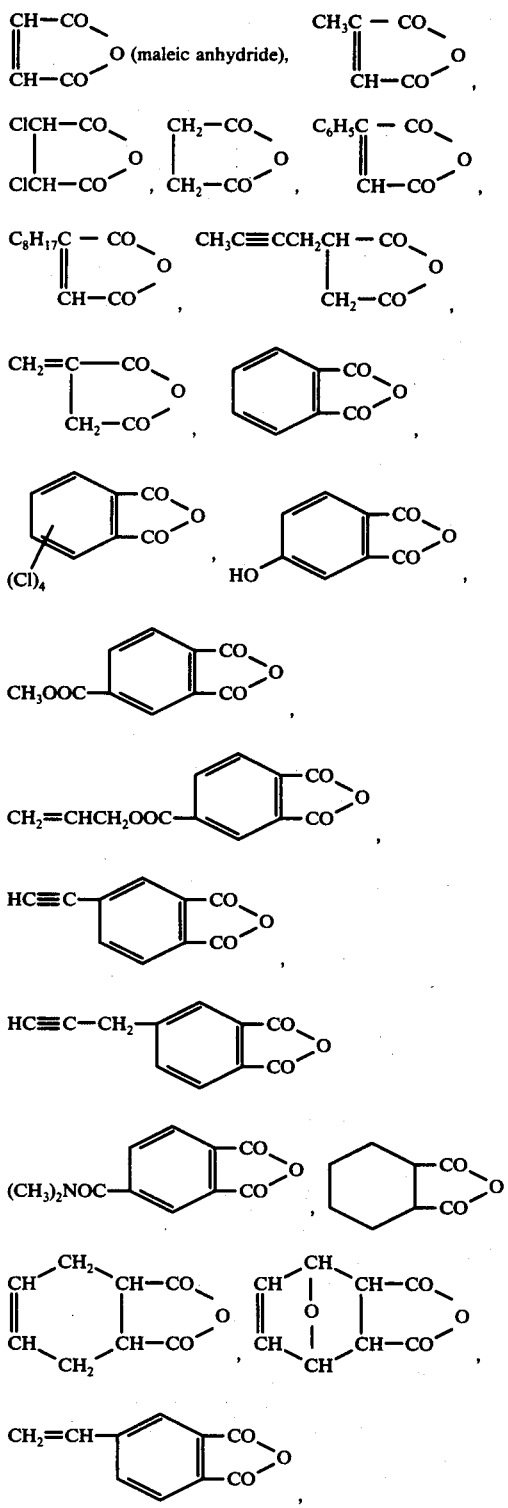

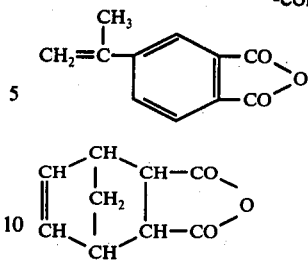

and the like.

The terms α,β in the expression α,β-monocarboxylic monoanhydride has reference to the position of substitution of the two carbonyl groups in the anhydride, and is equivalent to a 1,2 substitution on adjacent carbon atoms; in the benzenoid series this substitution is referred to as ortho substitution. The preferred monoanhydrides are maleic anhydride, phthalic anhydride,

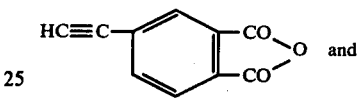 and

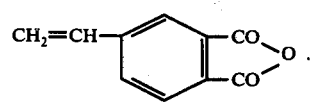

When maleic anhydride is used as the monoanhydride, cyclization is easily accomplished by removing the azeotroping agent from the reaction mixture and then adding a lower aliphatic acid anhydride such as acetic acid and an alkali metal salt of a lower aliphatic acid such as sodium or potassium acetate.

In carrying out the process of the invention, a reaction mixture of at least one dianhydride (except when n = 0), at least one diamine and the monoanhydride, in at least one aromatic phenol solvent is reacted in the presence of the organic azeotroping agent until substantially all of the water of reaction is eliminated. The reaction temperature is less than 140° C. and also should be below the boiling point of the aromatic phenol used but higher than the boiling point of the azeotroping agent. The vapor phase temperature lies between that of the water azeotrope and no higher than 95° C. As the water of reaction and azeotroping agent are removed from the reaction mixture, quantities of the azeotroping agent are returned to the reaction mixture so as to maintain the temperature and reaction mixture volume substantially constant. It is preferred that the process be continuous with continuous removal of water and continuous return of azeotroping agent. This is conveniently done by the use of a conventional Dean-Stark trap and condenser wherein after the azeotrope condenses, the water preferably sinks to the bottom of the trap for subsequent removal and the azeotroping agent overflows the trap and returns to the reaction mixture. Initially, the trap is filled with azeotroping agent.

The present azeotroping process with a return of the azeotroping agent is unique in that it prepares a substantially completely cyclized polyimide at low temperatures which is soluble in phenolic solvent. Time of reaction is generally less than 1 hour (usually 30–45 minutes) with a substantially quantitative yield of the polyimide in solution.

After the water of reaction is eliminated, the azeotroping agent is usually removed so that the solution of polyimide in aromatic phenol can either be directly used as a coating composition or adhesive or further treated before the polyimide is used. Further treatment of the solution can involve precipitation of the polyimide as a powder which can then be used in end-use applications. Also, the solution can be bodied, i.e., the polyimide increased in molecular weight by heating the solution with periodic removal of some of the phenolic solvent. Further, the polyimides can be further reacted to higher molecular weight polymers as described in my copending application Ser. No. 363,801, filed May 25, 1973.

Many substantially cyclized polyimides can be prepared by the process of the invention. They can either be monomeric, oligomeric or polymeric with the degree of repeating units being dependent to some extent on the molar ratio of dianhydride to diamine used. The polyimides prepared will have the structural formula:

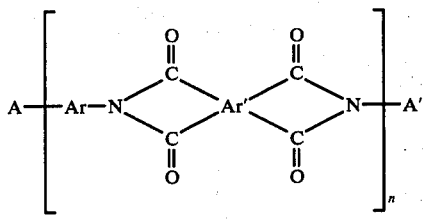

When the ratio is 1:1, the core of the polyimide will generally provide an $n$ of about 10–12 units and when the ratio is about 1.1:1, $n$ will be about 6 or 7 units. However, the number of units $n$ can be as high as 500 to 1,000 or greater. Usually $n$ will be in the range of about 1 to 100, preferably 4 to 15. The process of the invention enables the skilled artisan to control molecular weight through bodying and the reactivity of polymerization.

The soluble polyimides prepared by the present process have a number of uses. These include use of the solutions as wire and insulating varnishes and to impregnate fabric substrates used in making flexible and rigid electronic circuit boards and in making structural laminates. The solutions can be used to make fibers and films and as adhesives, particularly for film substrates, useful in aerospace and electronics applications. The powders can be used as molding powders and to make fibers and films.

The invention can be further understood by the following examples in which parts and percentages are by weight unless otherwise indicated.

EXAMPLE 1

Preparation of Maleimide-Terminated Oligomeric Polyimide (BTMI-3). Reaction of BTCA, SDA-3,3 and Maleic Anhydride (8:9:2).

In the m-cresol:benzene azeotropic apparatus, there was placed 3,3'-sulfonyldianiline (SDA-3,3) (2.2320 g. (0.009 mole) in 15 ml. of m-cresol and 10 ml. of benzene. After warming to approximately 50° C., a solution of maleic anhydride (0.1961 g., 0.002 mole) in 15 ml. of m-cresol was added over about ½ hour. The resulting solution was heated at 100° C. for 1 hour, and then a solution of 3,3',4,4'-benzophenonetetracarboxylic acid dianhydride (BTCA) (2.5778 g., 0.008 mole) in 20 ml. of m-cresol was added. The solution was heated to reflux, and over 1½ hours 0.27 ml. of water was collected. After cooling the reaction mixture was concentrated on a rotary flash evaporator and the residue was vacuum-dried at 150° C. for 30 hours. The residue was then dissolved in 30 ml. of m-cresol at 70°–80° C. and acetic anhydride (0.4686 g., 0.00261 mole) and sodium acetate (0.0215 g., 0.000261 mole) were added. The solution was heated and stirred at 70°–80° C. for 4 hours. The oligomer was then precipitated with methanol and was washed three times with hot methanol to yield, after vacuum-drying at 110° C., 4.6 g. (94%) of a yellow solid whose infrared spectrum was consistent with the structure of the expected compound. BTMI-3 began to melt at 260° C. but did not completely melt by 300° C. It was soluble in hot m-cresol, swelled considerably in hot DMAC and hot sulfolane.

The TGA in air of BTMI-3 showed a weight loss of approximately 7% below 300° C., due to retained m-cresol. A small sample was dried at 300° C. for 1 hour to give BTMI-3-H300, whose TGA in air shows a break at 400° C. and an inflection point in excess of 500° C.

Analysis: Calc'd. for $C_{252}H_{124}N_{18}O_{62}S_9$: C, 64.61; H, 2.67; N, 5.38; O, 21.18; S, 6.16. Found: C, 64.34; H, 2.95; N, 5.43; O, —; S, —.

When other dianhydrides of

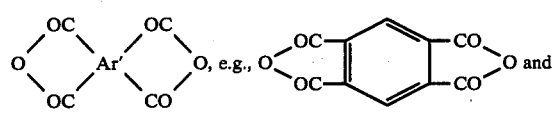

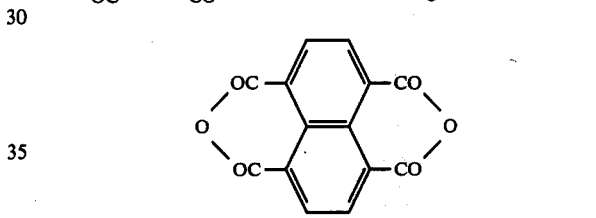

are used in equivalent amounts in this example instead of BTCA, the corresponding completely cyclized maleimide terminated diimide is obtained. Similarly, when phthalic anhydride, or olefinic substituted phthalic anhydrides, e.g.,

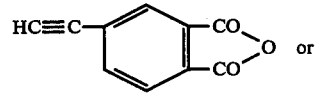

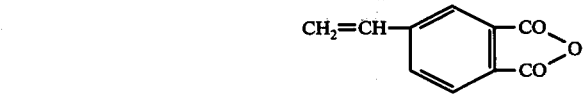

are used in an equivalent amount in this example instead of maleic anhydride with BTCA or the other dianhydrides, the corresponding phthalimide terminated diimides are obtained.

EXAMPLE 2

(a) Preparation of Maleimide-Terminated Oligomeric Polyimide (BTMI-4). Reaction of BTCA, SDA-4,4 and Maleic Anhydride (8:9:2).

In the m-cresol:benzene azeotropic apparatus there was placed 4,4'-sulfonyldianiline (SDA-4,4) (2.2320 g., 0.009 mole) in 15 ml. of m-cresol and 10 ml. of benzene. After warming to approximately 50° C., a solution of maleic anhydride (0.1961 g., 0.002 mole) in 15 ml. of m-cresol was added over about ½ hour. The resulting solution was heated at 100° C. for 1 hour, and then a solution of BTCA (2.5778 g., 0.008 mole) in 20 ml. of m-cresol was added. The solution was heated to reflux and over 1½ hours 0.27 ml. of water was collected. After cooling, the reaction mixture was concentrated on a rotary flash evaporator and the residue was vacuum-dried at 150° C. for 30 hours. The residue was then dissolved in 30 ml. of m-cresol at 70°-80° C. and acetic anhydride (0.4685 g., 0.00261 mole) and sodium acetate (0.0215 g., 0.000261 mole) were added. The solution was heated and stirred at 70°-80° C. for 4 hours. The oligomer was then precipitated with methanol and was washed 3 times with hot methanol to yield, after vacuum-drying at 110° C., 4.3 g. (88%) of a yellow solid whose infrared spectrum was consistent with that expected for the compound, and very similar to that of BTMI-3. BTMI-4 began to melt at 255° C. but did not completely melt by 300° C. It was soluble in hot m-cresol, DMAC and sulfolane.

The TGA in air of BTMI-4 showed a loss of approximately 7% below 300° C., due to retained solvent. A small sample was dried at 300° C. for 1 hour to give BTMI-4-H300 whose TGA in air is identical with that of BTMI-3-H300 and showed an inflection point in excess of 500° C.

Analysis: Calc'd. for $C_{252}H_{124}N_{18}O_{62}S_9$: C, 64.61; H, 2.67; N, 5.38; O, 21.18 S, 6.16. Found: C, 64.35; H, 2.81; N, 5.53; O, —; S, —.

b. Preparation of Maleamic-Acid-Terminated Oligomeric Polyimide (BTMA-1). Reaction of BTCA, ODA and Maleic Anhydride (1:2:2).

In the m-cresol:benzene azeotropic apparatus was placed oxydianiline (ODA) (4.004 g., 0.02 mole) in 15 ml. of m-cresol and 10 ml. of benzene. After warming to 40° C., a solution of maleic anhydride (1.961 g., 0.02 mole) in 15 ml. of m-cresol was added to give a red solution, which was heated at 90°-100° C. for 1 hour. A yellow precipitate soon formed which did not redissolve. Then BTCA (3.222 g., 0.01 mole) in 35 ml. of m-cresol was added. The temperature was maintained at 90°-100° C. for 1 hour. Solution did not occur. Then the temperature was raised to approximately 100° C. (reflux) and maintained for 1 ½ hours. No water was collected in the Dean-Stark trap. Then the reaction mixture was cooled, the solvent removed on a rotary flash evaporator and the residue was vacuum-dried at 150° C. for 24 hours to yield the hemiamic acid, 8.7088 g. (95%). The product was partially soluble in hot m-cresol and was insoluble in DMAC, sulfolane and acetic anhydride.

Analysis: Calc'd. for (hemiamic acid) $C_{49}H_{30}N_4O_{13}$: C, 66.66; H, 3.43; N, 6.30; O, 23.56. Found: C, 66.60; H, 3.55; N, 6.46; O, —.

What is claimed is:

1. A process for the preparation of a substantially cyclized polyimide of the formula:

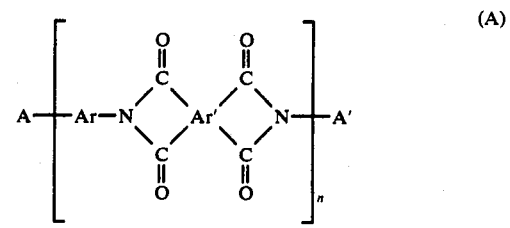

wherein
Ar is a divalent aromatic organic radical,
Ar' is a tetravalent aromatic organic radical, the four carbonyl groups being attached directly to separate carbon atoms and each pair of carbonyl groups being attached to adjacent carbon atoms in the Ar' radical, A is

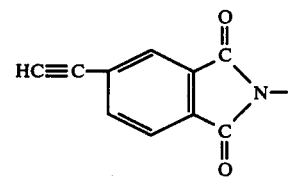

A' is

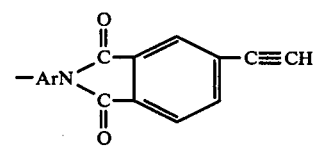

and $n$ is 0 or a positive integer of at least one, soluble in a phenol which comprises:

1. reacting a reaction mixture of at least one tetracarboxylic acid dianhydride of the formula:

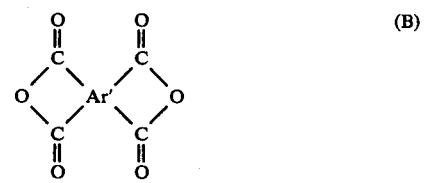

wherein Ar' is as defined above, and at least one aromatic diamine of the formula:

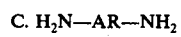

wherein Ar is as defined above, at a molar ratio of dianhydride to diamine of $m$ to $m + 1$ where $m$ is zero or a positive integer of at least one and as high as $n$ in formula (A), with the proviso that the reaction mixture contains 2 moles of an $\alpha,\beta$-carboxylic acid monoanhydride of the formula

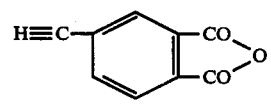

in a phenol of the formula

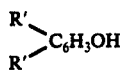

where each R' is hydrogen or —CH$_3$ in the presence of at least one organic azeotroping agent which:
  a. gives a water azeotrope having a boiling point less than 95° C at atmospheric pressure,
  b. is non-reactive with the dianhydride and the diamine, and
  c. separates from water as a distinct phase,
said reaction conducted at a temperature less than 140° C and below the boiling point of said phenol and higher than the boiling point of said azeotroping agent with the vapor phase temperature being between that of the water azeotrope and no higher than 95° C.
  2. removing water of reaction and the azeotroping agent from the reaction mixture as a water azeotrope and
  3. returning quantities of azeotroping agent to the reaction mixture to maintain the temperature and reaction mixture volume substantially constant.

2. The process of claim 1 wherein the phenol is m-cresol or a mixture of m-cresol and its isomers.

3. The process of claim 1 wherein the organic azeotroping agent is a cyclic hydrocarbon having 6 to 8 carbon atoms.

4. The process of claim 3 wherein the cyclic hydrocarbon is an aromatic hydrocarbon.

5. The process of claim 4 wherein the aromatic hydrocarbon is benzene or toluene.

6. The process of claim 1 wherein Ar' is a tetravalent radical containing at least one ring of six carbon atoms, said ring characterized by benzenoid unsaturation.

7. The process of claim 6 wherein Ar is a divalent benzenoid radical selected from the group consisting of

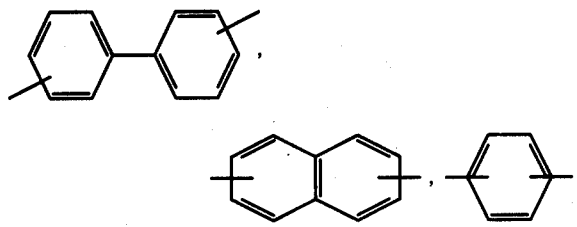

and multiples thereof connected to each other by R$^{IV}$ wherein
  R$^{IV}$ is selected from the group consisting of —CH=λ CH—, an alkylene chain of 1-3 carbon atoms,

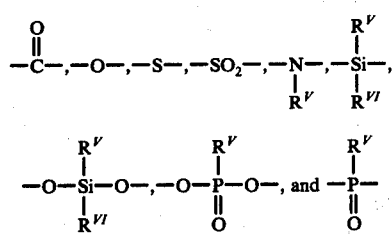

wherein
  R$^V$ and R$^{VI}$ are selected from the group consisting of alkyl and aryl of 1 to 6 carbon atoms.

8. The process of claim 7 wherein the phenol is m-cresol or a mixture of m-cresol and its isomers and the organic azeotroping agent is a cyclic hydrocarbon of 6 to 8 carbon atoms.

9. The process of claim 8 wherein the cyclic hydrocarbon is an aromatic hydrocarbon.

10. The process of claim 1 wherein the phenol is m-cresol or a mixture of m-cresol and its isomers and the organic azeotroping agent is a cyclic hydrocarbon of 6 to 8 carbon atoms.

11. The process of claim 1 wherein (1) the tetracarboxylic acid dianhydride is selected from the group consisting of 3,3',4,4'-benzophenonetetracarboxylic acid dianhydride, pyromelletic anhydride and 1,4,5,8-naphthalenetetracarboxylic acid dianhydride, (2) the aromatic diamine is selected from the group consisting of m-phenylenediamine, p-phenylenediamine, 4,4'-oxydianiline, 3,3'-sulfonyldianiline, 4,4'-diaminobenzophenone, 4,4'-methylenedianiline and 4,4'-diaminostilbene, (3) phenol is m-cresol or mixtures of m-cresol and its isomers and (4) the organic azeotroping agent is a cyclic hydrocarbon of 6 to 8 carbon atoms.

12. The process of claim 11 wherein the cyclic hydrocarbon is an aromatic hydrocarbon.

13. The process of claim 12 wherein n is at least 4 and the aromatic hydrocarbon is benzene.

14. The process of claim 11 wherein the cyclic hydrocarbon is subsequently removed.

15. The process of claim 1 wherein the azeotroping agent is subsequently removed.

16. A polyimide having the formula:

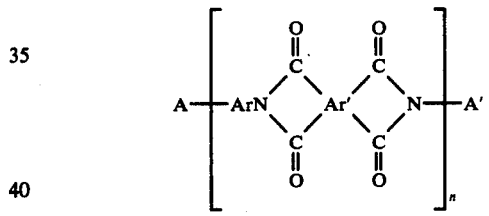

wherein
  Ar is a divalent aromatic organic radical,
  Ar' is a tetravalent aromatic organic radical, the four carbonyl groups being attached directly to separate carbon atoms and each pair of carbonyl groups being attached to adjacent carbon atoms in the Ar' radical,

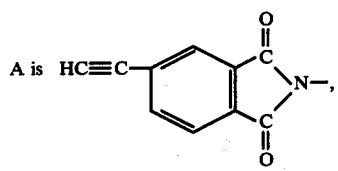

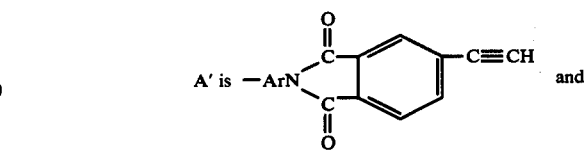

n has a numerical value of 1 to 100.

17. The polyimide of claim 16 which is soluble in phenol, cresols, xylenols or mixtures thereof.

* * * * *